United States Patent
Gurusamy et al.

(10) Patent No.: US 11,299,921 B2
(45) Date of Patent: Apr. 12, 2022

(54) HINGE ASSEMBLY

(71) Applicant: The Boeing Company, Chicago, IL (US)

(72) Inventors: Kiritharan Gurusamy, Karnataka (IN); Jagdish Shinde, Karnataka (IN); Yathish Belakavadi Madashetty, Kanataka (IN)

(73) Assignee: The Boeing Company, Chicago, IL (US)

( * ) Notice: Subject to any disclaimer, the term of this patent is extended or adjusted under 35 U.S.C. 154(b) by 29 days.

(21) Appl. No.: 16/821,085

(22) Filed: Mar. 17, 2020

(65) Prior Publication Data

US 2021/0293064 A1   Sep. 23, 2021

(51) Int. Cl.
*E05D 5/02* (2006.01)
*E05D 3/02* (2006.01)
*B64D 11/00* (2006.01)

(52) U.S. Cl.
CPC ............ *E05D 5/0207* (2013.01); *B64D 11/00* (2013.01); *E05D 3/02* (2013.01); *E05Y 2900/502* (2013.01)

(58) Field of Classification Search
CPC ... E05D 5/0207; E05D 3/02; E05Y 2900/502; B64D 11/00
See application file for complete search history.

(56) References Cited

U.S. PATENT DOCUMENTS

| | | | | |
|---|---|---|---|---|
| 2,281,158 | A * | 4/1942 | Keene | E05D 3/02 16/362 |
| 4,490,883 | A * | 1/1985 | Gauron | E05D 3/022 16/245 |
| 9,605,457 | B2 * | 3/2017 | Humble | E05D 7/04 |
| 9,758,233 | B2 * | 9/2017 | King | B64C 1/066 |
| 9,896,871 | B2 * | 2/2018 | Ungetheim | A61G 3/061 |
| 10,113,346 | B2 * | 10/2018 | Kohlweiss | E05D 5/128 |
| 10,329,818 | B2 * | 6/2019 | Lin | E05D 7/10 |
| 10,383,491 | B2 * | 8/2019 | Xu | E05D 5/02 |
| 2018/0002958 | A1 * | 1/2018 | Mironchuk | E05D 3/02 |
| 2020/0032565 | A1 * | 1/2020 | Culp | E05D 7/0009 |
| 2020/0165849 | A1 * | 5/2020 | Olkay | E05D 7/0415 |
| 2020/0284078 | A1 * | 9/2020 | Prim | E05D 5/0207 |
| 2020/0362504 | A1 * | 11/2020 | Li | E05D 11/0081 |

* cited by examiner

*Primary Examiner* — Victor D Batson
*Assistant Examiner* — Matthew J Sullivan
(74) *Attorney, Agent, or Firm* — Quinn IP Law

(57) ABSTRACT

A hinge assembly is designed to reduce the number of details in the hinge assembly and to simplify the construction of the hinge assembly. The hinge assembly includes an arm having a length with a pivot post on a first end of the arm and an arm lock on an opposite second end of the arm. An internally screw threaded hole extends through the arm block. The plate is attached to the second end of the arm. The plate has a plate surface configured for attachment to a ceiling panel and an opposite adjustment surface. A ridge extends across the adjustment surface and a slot extends through the ridge. The arm block is positioned adjacent the ridge with the internally screw threaded hole of the arm block aligned with the slot through the ridge. An externally screw threaded rod extends through the slot and is screw threaded into the internally screw threaded hole through the arm block. The externally screw threaded rod is turned in opposite directions to alternatively lock the arm to the plate, and release the arm from the plate for adjustable positioning of the plate relative to the arm.

20 Claims, 6 Drawing Sheets

HINGE ASSEMBLY

FIELD

This disclosure pertains to a hinge assembly that is designed to reduce the number of details in the hinge assembly and to simplify the construction of the hinge assembly. More specifically, this disclosure is directed to a hinge assembly that functions as a pivot arm hinge latch between a ceiling panel of an aircraft cabin and an upper surface of an overhead storage compartment of the aircraft cabin. The construction of the hinge assembly is simplified by reducing the number of details in the construction of the hinge assembly. This results in a reduction in the number of parts in the hinge assembly, a reduction in the overall cost for the hinge assembly, a reduction in the assembly time for the hinge assembly and a reduction in the time needed to adjust the hinge assembly.

BACKGROUND

In the construction of commercial passenger aircraft having storage compartments above the passenger seating along the length of the aircraft cabin and having ceiling panels above the storage compartments, hinge assemblies are connected between upper surfaces of the storage compartments and the ceiling panels. The hinge assemblies are provided to enable pivoting movement of the ceiling panels between locked positions where the ceiling panels extend from above the storage compartments, over the aircraft cabin to a center portion of the ceiling of the aircraft cabin, to unlocked positions where the ceiling panels can be pivoted downwardly from the center portion of the ceiling of the aircraft cabin to provide access to the areas behind the ceiling panels to perform maintenance in the areas behind the ceiling panels.

A representation of a side elevation view of a ceiling panel 10 pivoted between its upward, locked position and its downward, unlocked position is provided in FIG. 1. As represented in FIG. 1, a distal edge 12 of the ceiling panel 10 is positioned in a notch 14 that extends along the length of the aircraft cabin. The notch 14 receives the distal edge 12 of the ceiling panel 10 and supports the distal edge of the ceiling panel in the notch in the locked position of the ceiling panel.

The opposite proximal edge 16 of the ceiling panel 10 is attached to a hinge assembly 18. The hinge assembly 18 is connected between an upper surface 20 of a storage compartment 22 and the proximal edge 16 of the ceiling panel 10. There are typically two hinge assemblies 18 attached between the upper surface 20 of the storage compartment 22 and the proximal edge 16 of the ceiling panel 10. Each hinge assembly 18 is operable to enable the ceiling panel 10 to move between its upward, locked position represented in FIG. 1, and its lowered, unlocked position represented in dashed lines in FIG. 1 where access is provided behind the ceiling panel 10 for maintenance in the area behind the ceiling panel.

FIG. 2 is a representation of an enlarged, elevation view of the hinge assembly 18 of FIG. 1, In FIG. 2, the hinge assembly 18 is basically comprised of an arm 24, a base plate 26 and a support structure 28. As represented in FIG. 2, the base plate 26 is attached to the ceiling panel 10, the support structure 28 is attached to the upper surface 20 of a storage compartment 22 and the arm 24 is connected between the base plate 26 and the support structure 28. The connection of the arm 24 to the support structure 28 is a pivoting connection, enabling pivoting movement of the arm 24 and pivoting movement of the base plate 26 and the ceiling panel 10 between the upward, locked position of the ceiling panel 10 and the downward, unlocked position of the ceiling panel 10.

FIG. 3 is a representation of a perspective view of the hinge assembly 18 of FIGS. 1 and 2. In FIG. 3 the hinge assembly 18 is represented as being rotated from its operative position in FIGS. 1 and 2 to provide a perspective view of the bottom of the hinge assembly 18 and provide a better view of the details of the hinge assembly 18.

As represented in FIG. 3, the arm 24 has a length that extends between a first end 30 of the arm and an opposite second end 32 of the arm. There is a pivot post 34 at the first end 30 of the arm 24. The pivot post 34 has a lateral pivot axis 36. At the second end 32 of the arm 24 there is a flange formed as a tongue 38. The tongue 38 extends laterally across the second end 32 of the arm 24.

The base plate 26 has a panel surface 40 formed on one side of the base plate 26. An adjustment surface 42 is formed on the opposite side of the base plate 26. The panel surface 40 is configured for attachment to the ceiling panel 10.

There is a recess 44 formed in the adjustment surface 42. The recess 44 extends laterally across the adjustment surface 42. A flange 46 extends from an edge of the adjustment surface 42 adjacent the recess 44. The flange 46 extends over the recess 44 and over the tongue 38 at the second end 32 of the arm 24. The flange 46 secures the arm 24 to the base plate 26 while allowing the arm 24 to move freely in opposite lateral directions across the adjustment surface 42. This also enables the base plate 26 to move laterally in opposite directions relative to the arm 24.

An internally screw threaded hole 48 extends through the second end 32 of the arm 24. The internally screw threaded hole 48 extends laterally through the second end 32 of the arm 24.

A pair of protrusions 50 projects outwardly from the adjustment surface 42. The pair of protrusions 50 are positioned at laterally opposite ends of the adjustment surface 42 and on laterally opposite sides of the second end 32 of the arm 24. Each of the protrusions 50 has a bore hole 52 that extends laterally through the protrusion 50. The bore holes 52 of the protrusions 50 are coaxial, smooth holes having no internal screw threading.

A screw threaded rod 54 extends through the bore holes 52 of the protrusions 50 at the laterally opposite ends of the base plate 26. The bore holes 52 are dimensioned larger than the screw threaded rod 54, and the screw threaded rod 54 is free to rotate in the bore holes 52. The screw threaded rod 54 is screw threaded in the internally screw threaded hole 48 through the second end 32 of the arm 24. The screw threaded rod 54 has a pair of heads 56 secured on opposite ends of the rod. The heads 56 are positioned laterally outside the protrusions 50. The heads 56 can be manually turned in opposite directions, or can be engaged by a tool for turning the heads 56 in opposite directions.

As represented in FIG. 3, by turning either one or both of the heads 56 on the screw threaded rod 54 in one direction, the rotation of the screw threaded rod 54 will screw the rod through the internally screw threaded hole 48 at the second end 32 of the arm 24. This in turn will cause the base plate 26 to move in one lateral direction relative to the arm 24. By turning one or both of the heads 56 in the opposite direction of rotation, the rotation of the screw threaded rod 54 will screw the rod through the internally screw threaded hole 48 at the second end 32 of the arm 24 and cause the base plate 26 to move in the opposite lateral direction relative to the arm 24. With the base plate 26 attached to a ceiling panel 10, turning the heads 56 at the opposite ends of the screw threaded rod 54 in opposite directions results in the base plate 26 moving the ceiling panel 10 in opposite lateral directions relative to the arm 24. In this manner, the hinge assembly 18 adjusts the lateral position of the ceiling panel 10 attached to the base plate 26 relative to the arm 24 and relative to the hinge assembly 18.

The above described hinge assembly 18 represented in FIGS. 1-3 has a complicated construction. The construction of the hinge assembly 18 requires the internally screw threaded hole 48 extending laterally through the second end 32 of the arm 24, the screw threaded rod 54 screw threaded into the internally screw threaded hole 48 through the second end 32 of the arm 24, the pair of protrusions 50 projecting outwardly from the adjustment surface 42 of the base plate 26, and the heads 56 at the opposite ends of the screw threaded rod 54. The above described construction of the hinge assembly 18 represented in FIGS. 1-3 is complex, has a number of construction features or parts that result in the complexity of the design, and the number of construction features or parts add to the overall cost of producing the hinge assembly 18 and add to the overall time required to assemble the hinge assembly 18.

SUMMARY

The hinge assembly of this disclosure has a much more simplified design than the hinge assembly of FIGS. 1-3. The simplified design of the hinge assembly of this disclosure reduces the overall cost of producing the hinge assembly, reduces the time required to assemble the hinge assembly, and simplifies the operation of the hinge assembly in adjustably positioning a ceiling panel attached to the hinge assembly from side to side relative to an upper surface of a storage compartment to which the hinge assembly is attached.

The hinge assembly has an arm that has a generally longitudinally oriented length. The arm extends between a first end of the arm and an opposite second end of the arm.

A post is on the first end of the arm. The post has a lateral length that extends between a first end of the post and an opposite second end of the post. The lateral length of the post defines a lateral axis.

An arm block is provided on the second end of the arm. The arm block has a hole through the arm block. The hole has internal screw threading. The hole has a longitudinal length that extends between a first end surface of the arm block and an opposite second end surface of the arm block. The longitudinal length of the hole defines a longitudinal axis.

The longitudinal axis and the lateral axis are mutually perpendicular and define mutually perpendicular longitudinal and lateral directions relative to the hinge assembly.

A plate is attached to the second end of the arm. The plate has a panel surface configured for attachment to a separate panel, for example a ceiling panel of an aircraft cabin. The plate has an opposite adjustment surface.

There is a first ridge on the adjustment surface of the plate. The first ridge extends laterally across the adjustment surface.

There is a slot through the first ridge. The slot extends laterally across the first ridge.

There is a second ridge on the adjustment surface of the plate. The second ridge extends laterally across the adjustment surface. There is a longitudinal spacing between the first ridge and the second ridge.

The arm block on the second end of the arm is positioned in the spacing between the first ridge and the second ridge. The arm block is adjacent to an slides between the first ridge and the second ridge. The internally screw threaded hole through the arm block is aligned with the slot through the first ridge. The arm block is moveable laterally in opposite directions through the spacing between the first ridge and the second ridge. The arm block is also moveable along the slot in the first ridge in opposite lateral directions relative to the first ridge and the second ridge. The movement of the arm block through the spacing in opposite lateral directions relative to the first ridge and the second ridge adjusts a lateral position of the arm block and the arm relative to the first ridge, the second ridge and the plate. The movement of the arm block in opposite lateral directions also adjusts a lateral position of the plate relative to the arm.

A rod having external screw threading extends longitudinally through the slot and is screw threaded into the screw threading of the hole through the arm block. The externally screw threaded rod is operable to secure the arm block and the arm to the second ridge and the plate by screw threading the rod through the internally screw threaded hole through the arm block and into engagement with the second ridge. Thus, the arm block is secured against movement in opposite lateral directions along the first ridge and the second ridge in response to the rod being turned in a first direction relative to the arm block causing the rod to engage against the second ridge. This secures the plate and the second ridge in an adjusted position relative to the arm block and the arm. The externally screw threaded rod is also operable to enable the arm block to be moved in opposite lateral directions along the first ridge and the second ridge to adjust a lateral position of the plate, the first ridge and the second ridge relative to the arm block and the arm. This is achieved in response to rotating the externally screw threaded rod in a second direction, opposite the first direction relative to the arm block, causing the externally screw threaded rod to disengage from the second ridge.

The features, functions, and advantages that have been discussed can be achieved independently in various embodiments or may be combined in yet other embodiments, further details of which can be seen with reference to the following description and drawings.

DETAILED DESCRIPTION

The hinge assembly 60 of this disclosure is basically comprised of an arm 62 and a plate 64. The arm 62 and plate 64 are constructed of lightweight, inexpensive materials, such as plastic or a metal such as aluminum. Other equivalent materials could be employed in the construction of the hinge assembly 60 that provide the hinge assembly 60 with sufficient strength to perform its intended functions.

Figure 1:
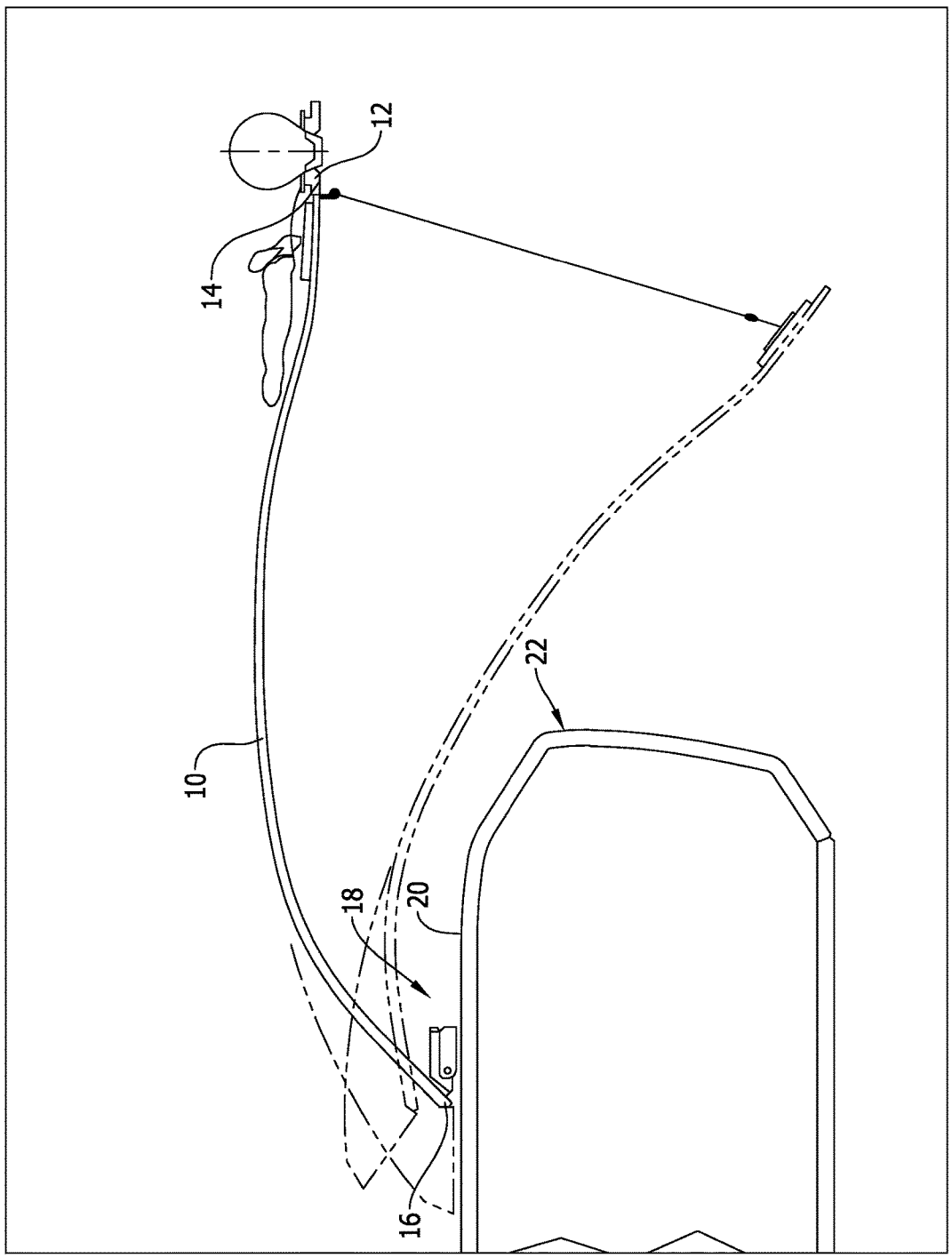
FIG. 1 is a representation of a side elevation view of a prior art ceiling panel pivoted between an upward, locked position and a downward, unlocked position of the ceiling panel.
Figure 2:
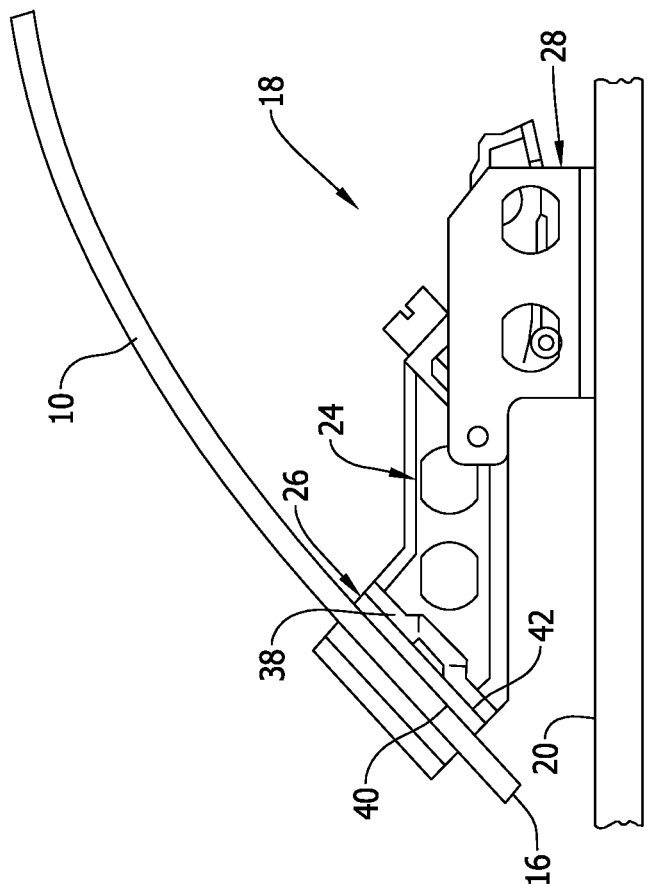
FIG. 2 is a representation of an enlarged, side elevation view of the prior art hinge assembly of FIG. 1.
Figure 3:
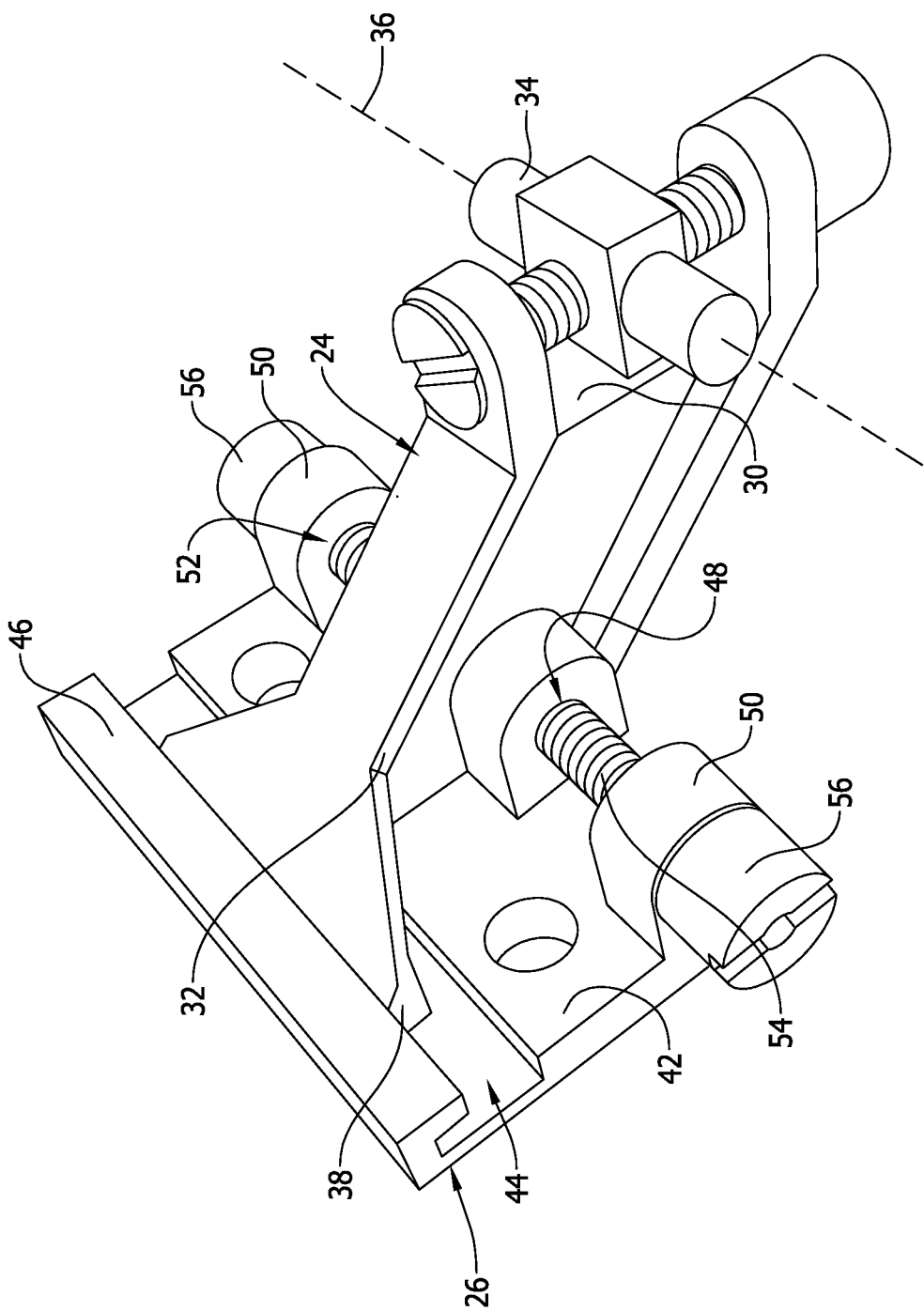
FIG. 3 is a representation of a perspective view of the prior art hinge assembly of FIGS. 1 and 2.
Figure 4:
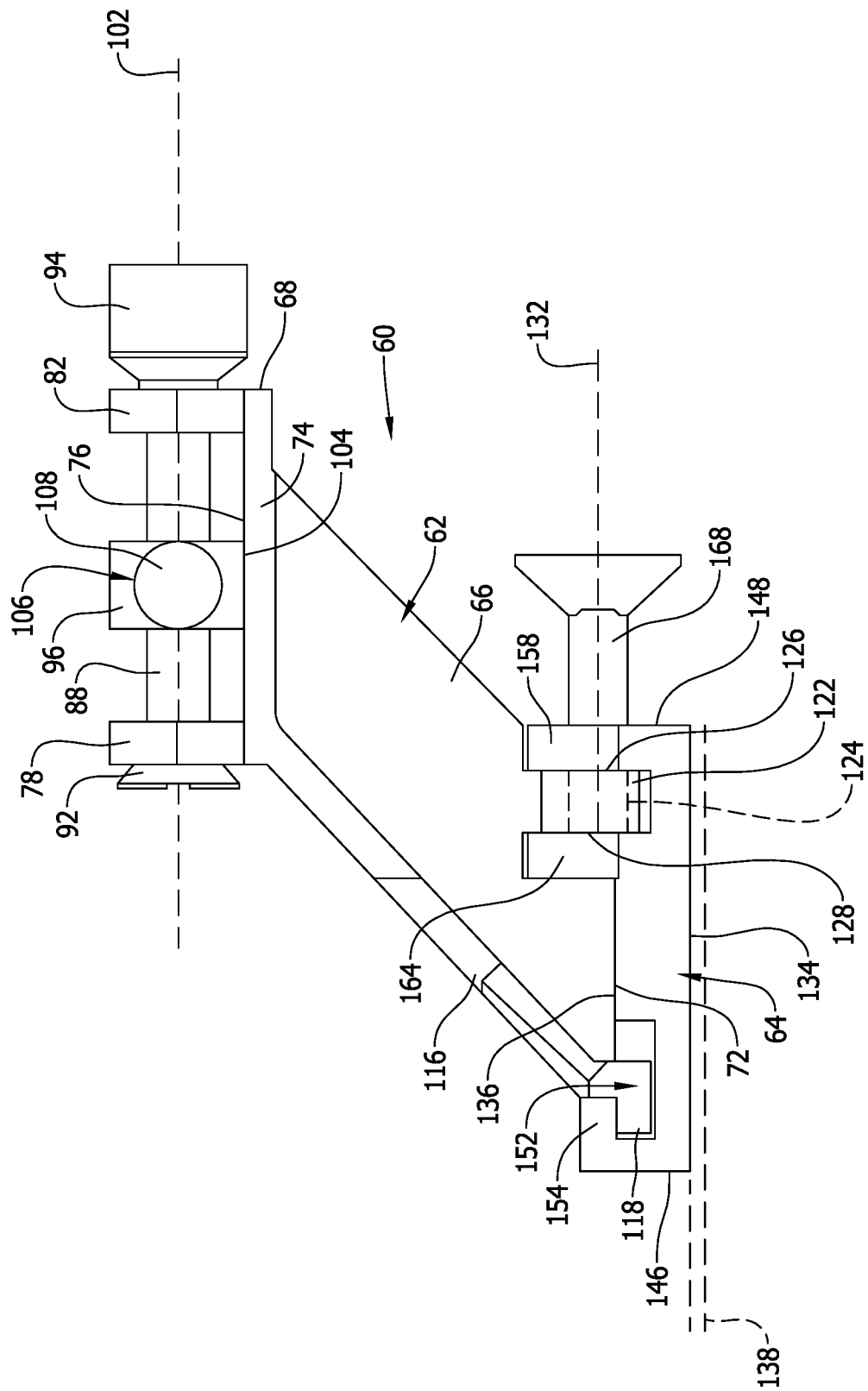
FIG. 4 is a representation of a side elevation view of the hinge assembly of this disclosure.
Figure 5:
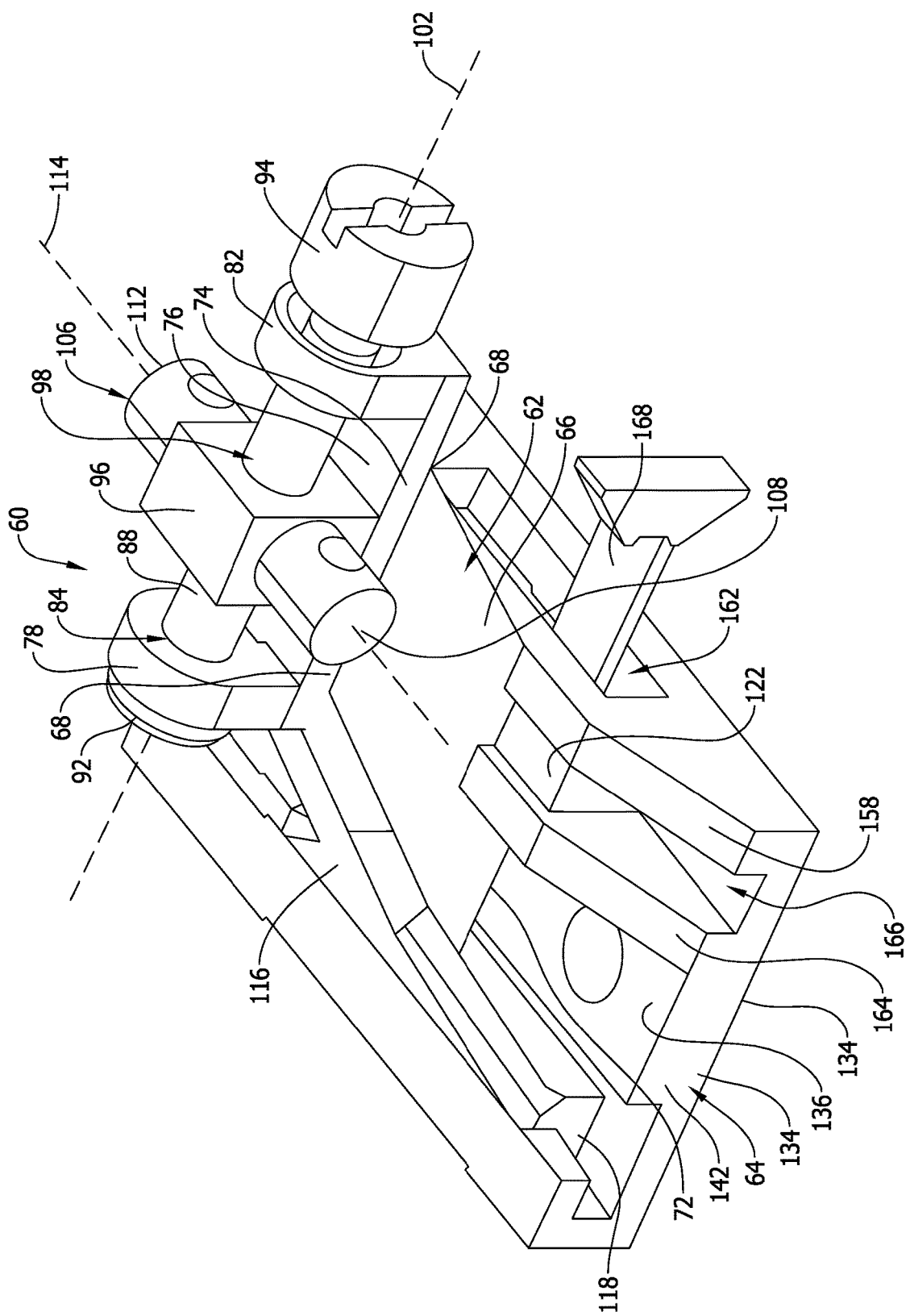
FIG. 5 is a representation of a perspective view of the right side of the hinge assembly represented in FIG. 4.
Figure 6:
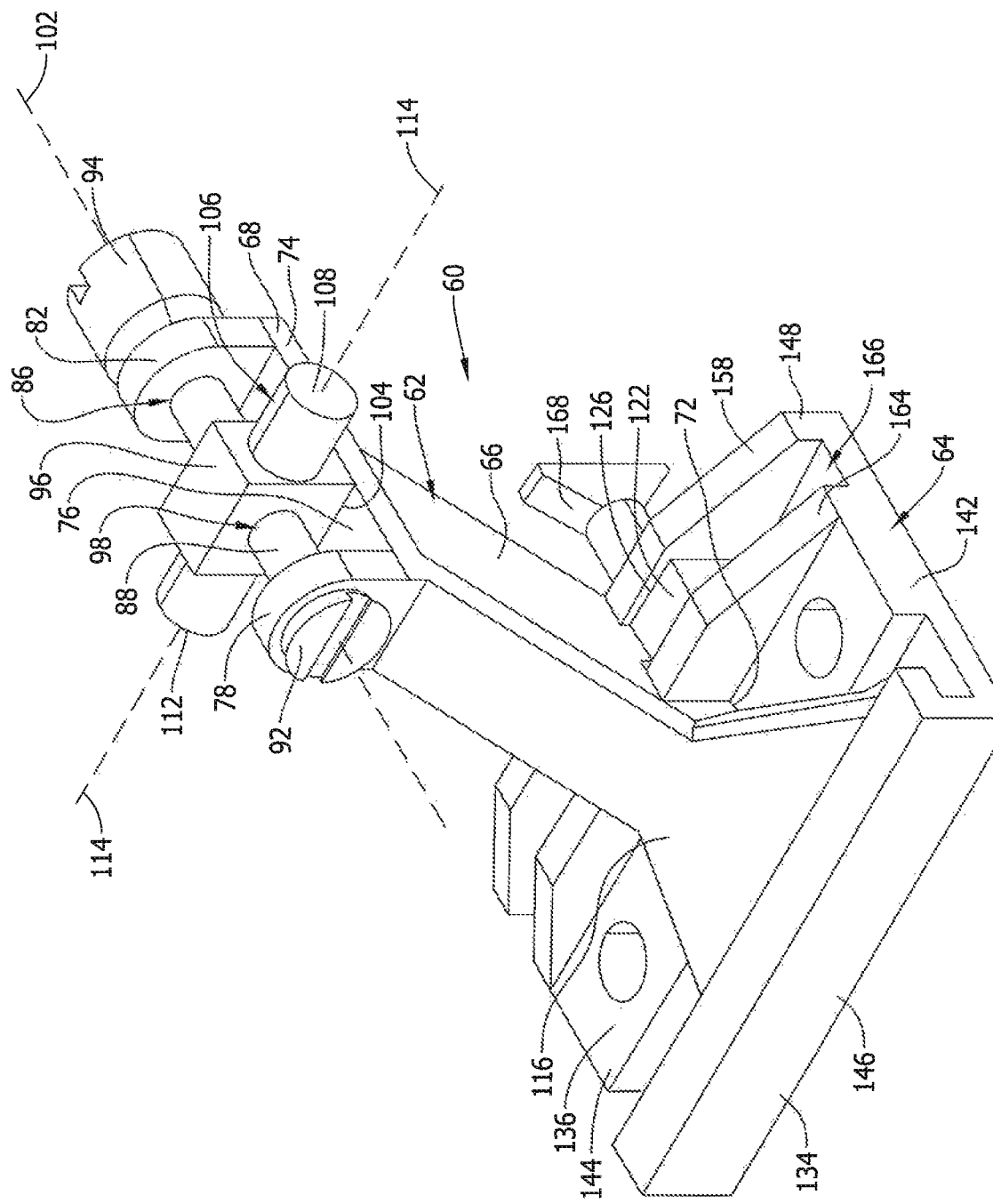
FIG. 6 is a representation of a perspective view of the left side of the hinge assembly represented in FIG. 4.

The arm 62 is formed with a planar web 66 that extends from a first end or rearward end 68 of the arm to an opposite second end or forward end 72 of the arm. As represented in FIGS. 4-6, the web 66 has a general configuration of a parallelogram.

A narrow rectangular flange 74 is integrally formed at the first end 68 of the arm 62. The flange 74 extends entirely across the first end 68 of the arm 62. The flange 74 has a flat surface 76 opposite the web 66.

A pair of walls 78, 82 extend outwardly from opposite ends of the flat surface 76 of the flange 74. The pair of walls 78, 82 each have a hole 84, 86, respectively extending through each wall 78, 82. The holes 84, 86 are coaxial.

A threaded shaft 88 is mounted for rotation in the holes 84, 86. The threaded shaft 88 is free to rotate in the holes 84, 86. A pair of heads 92, 94 are provided on opposite ends of the threaded shaft 88 outside the walls 78, 82. At least one of the heads 94 is configured for being rotated manually or by a tool such as a screwdriver, alien wrench, or other equivalent type of tool engaged with the head 94.

There is a slide block 96 mounted on the threaded shaft 88. The slide block 96 has a cubic configuration and has an internally screw threaded hole 98 extending through the slide block. The internally screw threaded hole 98 has a center axis 102 that is a longitudinally oriented axis relative to the hinge assembly 60. An exterior surface 104 of the cubic slide block 96 engages in sliding engagement against the flat surface 76 of the flange 74 for sliding movement of the slide block 96 in opposite longitudinal directions across the flat surface 76. The threaded shaft 88 is screw threaded into the internally screw threaded hole 98 of the slide block 96. By rotation of the shaft head 94 in opposite directions, the slide block 96 slides over the flat surface 76 of the flange 74 in longitudinally opposite directions.

A post 106 projects from opposite sides of the slide block 96 on the first end of the arm 62. The post 106 functions as a pivot post. The post 106 has a lateral length that extends between a first end 108 of the post and a second end 112 of the post. The lateral length of the post 106 has a laterally oriented axis 114 relative to the hinge assembly 60. The longitudinally oriented axis 102 and the laterally oriented axis 114 are perpendicular and define mutually perpendicular directions relative to the hinge assembly 60.

The arm 62 has a bottom flange 116. The bottom flange 116 extends across a bottom edge of the web 66 from the flange 74 at the first end 68 of the arm 62 to the second end 72 of the arm 62. As the bottom flange 116 extends from the flange 74 at the first end 68 of the arm 62, a lateral width of the bottom flange 116 increases. The lateral width of the bottom flange 116 increases as the bottom flange extends from the first end 68 of the arm 62 to the second end 72 of the arm. At the second end 72 of the arm 62, the bottom flange 116 is formed as a tongue 118 that extends across the lateral width of the bottom flange 116 at the second end 72 of the arm 62.

There is a block or arm block 122 integrally formed at the second end 72 of the arm 62. The arm block 122 has a cubic configuration and has an internally screw threaded hole 124 extending longitudinally through the arm block. The internally screw threaded hole 124 is represented by dashed lines in FIG. 4. The arm block hole 124 has a longitudinal length that extends between a first surface 126 of the arm block 122 and an opposite second surface 128 of the arm block. The longitudinal length of the arm block hole 124 has a longitudinal axis 132.

The plate 64 is a generally planar plate with a rectangular configuration. The plate 64 has a panel surface 134 on one side of the plate 64 and an adjustment surface 136 opposite the panel surface 134. The panel surface 134 is represented as being a flat surface, but could also be a curved surface. The panel surface 134 is configured for attachment by mechanical fasteners or other equivalent means to a separate panel 138, for example a ceiling panel of an aircraft cabin. The separate panel 138 is represented by dashed lines in FIG. 4.

The rectangular configuration of the plate adjustment surface 136 is defined by a first edge 142 of the adjustment surface and an opposite second edge 144 of the adjustment surface, and a third edge 146 of the adjustment surface and an opposite fourth edge 148 of the adjustment surface. The adjustment surface 136 has a width dimension between the first edge 142 of the adjustment surface 136 and the opposite second edge 144 of the adjustment surface 136.

There is a recess 152 formed in the adjustment surface 136. The recess 152 has a rectangular cross-section configuration. The recess 152 extends completely, laterally across the adjustment surface 136 from the first edge 142 of the adjustment surface to the second edge 144 of the adjustment surface. The recess 152 is positioned adjacent the third edge 146 of the adjustment surface.

A flange 154 extends from the third edge 146 of the adjustment surface. The flange 154 extends laterally, entirely across the adjustment surface 136 from the first edge 142 of the adjustment surface to the second edge 144 of the adjustment surface. The flange 154 projects over the recess 152. As represented in the drawing figures, the flange 154 extends over the tongue 118 at the second end 72 of the arm 62. The flange 154 extending over the tongue 118 secures the arm 62 to the plate 64 while allowing the arm 62 to move freely in opposite lateral directions across the adjustment surface 136.

A ridge 158 is formed on the adjustment surface 136. The ridge 158 is a first ridge on the adjustment surface 136. As represented in the drawing figures, the first ridge 158 extends across the adjustment surface 136 along the forth edge 148 of the adjustment surface. The first ridge 158 extends from the first edge 142 of the adjustment surface to the second edge 144 of the adjustment surface.

There is a slot 162 formed through the first ridge 158. The slot 162 extends laterally across the first ridge 158.

There is a ridge 164 formed on the adjustment surface 136 adjacent the first ridge 158. The ridge 154 is a second ridge. The second ridge 164 extends laterally across the adjustment surface 136 and is similar in construction to the first ridge 158. However, the second ridge 164 does not have a slot as does the first ridge 158. The second ridge 164 extends laterally across the adjustment surface 136 parallel with the first ridge 158. The second ridge 164 extends laterally across the adjustment surface 136 from the first edge 142 of the adjustment surface to the second edge 144 of the adjustment surface.

There is a spacing between the first ridge 158 and the second ridge 164. The spacing between the first ridge 158 and the second ridge 164 defines a groove 166. The groove 166 extends laterally across the adjustment surface 136 from the first edge 142 of the adjustment surface to the second edge 144 of the adjustment surface. The groove 166 has a rectangular cross-section configuration.

The block or arm block 122 is positioned in the spacing between the first ridge 158 and the second ridge 164 that defines the groove 166. The arm block 122 positioned in the groove 166 has a rectangular cross-section configuration that conforms to the rectangular cross-section configuration of the groove 166.

A rod 168 having external screw threading extends through the slot 162 through the first ridge 158 and into the internally screw threaded hole 124 through the arm block 122. The external screw threading of the rod 168 is screw threaded into the internal screw threading of the hole 124 through the arm block 122. The rod 122 has an axis of rotation that is collinear with the longitudinal axis 132 of the internally screw threaded hole 124 through the arm block 122. The lateral axis 114 of the slide block post 106 and the rotation axis 132 of the rod 168 are perpendicular. In response to turning the rod 168 in a first direction for example the clockwise direction, the rod 168 is operable to secure the arm block 122 to the ridge, and more specifically to the first ridge 158 and the second ridge 164, against movement of the arm block in opposite lateral directions relative to the first ridge 158 and the second ridge 164. The rod 168 secures the plate 64 in an adjusted position relative to the arm block 122 in response to turning the rod in the first direction relative to the arm block 122, causing the rod 168 to engage against the second ridge 164. The rod 168 is operable to enable the arm block 122 to move along the first ridge 158 and the second ridge 164 in opposite lateral directions relative to the first ridge 158 and the second ridge 164 to adjust a lateral position of the arm block 122 and the arm 62 relative to the first ridge 158, the second ridge 164 and the plate 64 in response to rotating the rod in a second direction, for example the counterclockwise direction, relative to the arm block 122 causing the rod 168 to disengage from the second ridge 164.

As various modifications could be made in the construction of the hinge assembly and its method of use herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A hinge assembly comprising:
an arm, the arm having a length that extends between a first end of the arm and a second end of the arm;
a post on the first end of the arm, the post having a laterally oriented axis, the post enabling the arm to be moved in a pivoting movement about the post;
an arm block on the second end of the arm, the arm block having an internally screw threaded hole through the arm block, the internally screw threaded hole having a longitudinally oriented axis;
the laterally oriented axis and the longitudinally oriented axis being mutually perpendicular and defining mutually perpendicular lateral and longitudinal directions, respectively;
a plate, the plate having a panel surface configured for attachment to a separate panel, the plate having an adjustment surface opposite the panel surface;
a ridge on the adjustment surface, the ridge extending laterally across the adjustment surface;
a slot through the ridge, the slot extending laterally across the ridge;
the arm block on the second end of the arm being positioned adjacent the ridge with the internally screw threaded hole through the arm block aligned with the slot through the ridge, the arm block being movable along the ridge and the slot in opposite lateral directions relative to the ridge and the slot to adjust a position of the plate and the ridge relative to the arm block and the arm; and,
an externally screw threaded rod extending through the slot and screw threaded into the internally screw threaded hole through the arm block, the externally screw threaded rod being operable to secure the plate and the ridge in an adjusted position relative to the arm block and the arm in response to turning the externally screw threaded rod in a first direction relative to the arm block, and to enable the arm block to be moveable in opposite lateral directions along the ridge to adjust a lateral position of the plate and the ridge relative to the arm block and the arm in response to the externally screw threaded rod being turned in a second direction opposite the first direction relative to the arm block.

2. The hinge assembly of claim 1, further comprising:
the externally screw threaded rod being movable along the slot in opposite directions when the externally screw threaded rod does not secure the plate and the ridge in the adjusted position relative to the arm block and the arm.

3. The hinge assembly of claim 1, further comprising:
the ridge being a first ridge on the adjustment surface;
a second ridge on the adjustment surface, the second ridge extending across the adjustment surface parallel with the first ridge;
a spacing between the first ridge and the second ridge; and,
the arm block positioned in the spacing between the first ridge and the second ridge.

4. The hinge assembly of claim 3, further comprising:
the externally screw threaded rod being operable to engage against the second ridge and secure the plate, the first ridge and the second ridge in the adjusted position relative to the arm block and the arm in response to turning the externally screw threaded rod in the first direction relative to the arm block, and the externally screw threaded rod being operable to disengage from the second ridge in response to the externally screw threaded rod being turned in the second direction relative to the arm block.

5. The hinge assembly of claim 3, further comprising:
the spacing between the first ridge and the second ridge defining a groove across the adjustment surface between the first ridge and the second ridge, the groove having a rectangular cross-section configuration; and,
the arm block being positioned in the groove, the arm block having a rectangular cross-section configuration that conforms to the rectangular cross-section configuration of the groove.

6. The hinge assembly of claim 3, further comprising:
the adjustment surface having a width dimension between a first edge of the adjustment surface and an opposite second edge of the adjustment surface;
the spacing between the first ridge and the second ridge defining a groove across the adjustment surface between the first ridge and the second ridge;
the first ridge extending across the adjustment surface from the first edge of the adjustment surface to the second edge of the adjustment surface;

the second ridge extending across the adjustment surface from the first edge of the adjustment surface to the second edge of the adjustment surface; and, the groove extending across the adjustment surface from the first edge of the adjustment surface to the second edge of the adjustment surface.

7. The hinge assembly of claim 1, further comprising:
the post having a pivot axis extending through the post, the pivot axis being coaxial with the laterally oriented axis, the post enabling the arm to be moved in a pivoting movement about the pivot axis;
the ridge extending across the adjustment surface parallel with the pivot axis; and,
the slot being parallel with the pivot axis.

8. The hinge assembly of claim 7, further comprising:
the externally screw threaded rod having an axis of rotation; and,
the pivot axis and the axis of rotation being perpendicular.

9. The hinge assembly of claim 1, further comprising:
the panel surface of the plate being configured for attachment to a ceiling panel of an aircraft cabin.

10. A hinge assembly comprising:
an arm having a length that extends between a first end of the arm and a second end of the arm;
a post on the first end of the arm, the post having a lateral length that extends between a first end of the post and a second end of the post, the lateral length of the post having a lateral axis;
an arm block on the second end of the arm, the arm block having a hole through the arm block, the hole having a longitudinal length that extends between a first surface of the arm block and a second surface of the arm block, the longitudinal length of the hole having a longitudinal axis, the hole having internal screw threading;
the longitudinal axis and the lateral axis being mutually perpendicular and defining mutually perpendicular longitudinal and lateral directions relative to the hinge assembly, respectively;
a plate, the plate having a panel surface configured for attachment to a separate panel and an opposite adjustment surface;
a ridge on the adjustment surface of the plate, the ridge extending laterally across the adjustment surface;
the arm block on the second end of the arm being positioned adjacent the ridge, the arm block being movable along the ridge in opposite lateral directions relative to the ridge to adjust a lateral position of the arm block and the arm relative to the ridge and the plate; and,
a rod, the rod having external screw threading, the rod being screw threaded into the internal screw threading of the hole through the arm block, the rod being operable to secure the arm block to the ridge against movement of the arm block in opposite lateral directions along the ridge in response to the rod being turned in a first direction relative to the arm block causing the rod to engage against the ridge, and the rod being operable to enable the arm block to be moved in opposite lateral directions along the ridge to adjust the lateral position of the arm block and the arm relative to the ridge and the plate in response to rotating the rod in a second direction relative to the arm block causing the rod to disengage from the ridge.

11. The hinge assembly of claim 10, further comprising:
the ridge being a second ridge on the adjustment surface;
a first ridge on the adjustment surface, the first ridge extending laterally across the adjustment surface parallel with the second ridge;
a slot through the first ridge, the slot extending laterally across the first ridge;
a spacing between the first ridge and the second ridge; and,
the arm block positioned in the spacing between the first ridge and the second ridge.

12. The hinge assembly of claim 11, further comprising:
the rod extending longitudinally through the slot and into the internal screw threading of the hole through the arm block; and,
the rod being moveable laterally along the slot in opposite lateral directions in response to the arm block being moved in opposite lateral directions to adjust the lateral position of the arm block and the arm relative to the first ridge, the second ridge and the plate.

13. The hinge assembly of claim 11, further comprising:
the spacing between the first ridge and the second ridge defining a groove extending laterally across the adjustment surface between the first ridge and the second ridge, the groove having a rectangular cross-section configuration; and,
the arm block being positioned in the groove, the arm block having a rectangular cross-section configuration that conforms to the rectangular cross-section configuration of the groove.

14. The hinge assembly of claim 13, further comprising:
the adjustment surface having a lateral width dimension between a first edge of the adjustment surface and an opposite second edge of the adjustment surface;
the first ridge extending laterally across the adjustment surface from the first edge of the adjustment surface to the second edge of the adjustment surface;
the second ridge extending laterally across the adjustment surface from the first edge of the adjustment surface to the second edge of the adjustment surface; and,
the groove extending laterally across the adjustment surface from the first edge of the adjustment surface to the second edge of the adjustment surface.

15. The hinge assembly of claim 13, further comprising:
the first ridge having a lateral length that is parallel with the lateral axis;
the second ridge having a lateral length that is parallel with the lateral axis; and,
the groove adding a lateral length that is parallel with the lateral axis.

16. The hinge assembly of claim 10, further comprising:
the rod having an axis of rotation; and,
the axis of rotation being parallel with the longitudinal axis and perpendicular with the lateral axis.

17. The hinge assembly of claim 10, further comprising:
the panel surface of the plate being configured for attachment to a ceiling panel of an aircraft cabin.

18. A method of adjusting a hinge assembly, the method comprising:
positioning an arm of the hinge assembly adjacent a plate of the hinge assembly with the arm having a post at a first end of the arm that enables pivoting movement of the arm about the post and the arm having an arm block on a second end of the arm with the arm block having an internally screw threaded hole through the arm block;
positioning the arm block on the second end of the arm adjacent a ridge on an adjustment surface of the plate and adjacent a slot extending across the ridge; and, extending an externally screw threaded rod through the slot and screw threading the externally screw threaded rod into the internally screw threaded hole through the arm block with the externally screw threaded rod securing the plate and the ridge in an adjusted position relative to the arm block and the arm in response to turning the externally screw threaded rod in a first direction relative to the arm block, and the externally screw threaded rod being operable to enable the arm block to be movable along the ridge to an adjusted position of the plate and the ridge relative to the arm block and the arm in response to the externally screw threaded rod being turned in a second direction opposite the first direction relative to the arm block.

19. The method of claim 18, further comprising:
positioning the arm block on the second end of the arm in a spacing between the ridge and a second ridge on the adjustment surface of the plate with the arm block positioned in the spacing between the ridge and the second ridge.

20. The method of claim 19, further comprising:
turning the externally screw threaded rod in the first direction relative to the arm block to cause the externally screw threaded rod to engage against the second ridge and secure the plate in the adjusted position relative to the arm block and the arm, and disengaging the externally screw threaded rod from the second ridge in response to the externally screw threaded rod being turned in the second direction relative to the arm block.

\* \* \* \* \*